US012801198B2

(12) United States Patent
Li

(10) Patent No.: US 12,801,198 B2
(45) Date of Patent: Nov. 17, 2026

(54) ELECTRONIC APPARATUS USING USB TYPE-C PORT AND COMPATIBILITY ABNORMAL ELIMINATION METHOD THEREOF

(71) Applicant: Acer Incorporated, New Taipei City (TW)

(72) Inventor: Yuan-Yi Li, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 140 days.

(21) Appl. No.: 18/890,759

(22) Filed: Sep. 20, 2024

(65) Prior Publication Data

US 2025/0370523 A1 Dec. 4, 2025

(30) Foreign Application Priority Data

Jun. 4, 2024 (TW) ................................ 113120692

(51) Int. Cl.
*G06F 1/32* (2019.01)
*G06F 1/26* (2006.01)
*G06F 13/42* (2006.01)

(52) U.S. Cl.
CPC .......... *G06F 1/266* (2013.01); *G06F 13/4282* (2013.01); *G06F 2213/0042* (2013.01)

(58) Field of Classification Search
CPC .................................... G06F 1/32; G06F 9/44
See application file for complete search history.

(56) References Cited

U.S. PATENT DOCUMENTS

| | | | | |
|---|---|---|---|---|
| 8,554,215 | B1 * | 10/2013 | Narendran ............ | H04W 76/11 455/448 |
| 10,394,722 | B1 * | 8/2019 | Vajravel ................ | G06F 13/102 |
| 2022/0197364 | A1 | 6/2022 | Gopalakrishnan et al. | |

FOREIGN PATENT DOCUMENTS

| | | |
|---|---|---|
| CN | 109643265 | 4/2019 |
| CN | 113835515 | 12/2021 |
| CN | 113193915 | 7/2022 |
| TW | 200625144 | 7/2006 |
| TW | I737148 | 8/2021 |
| TW | I765391 | 5/2022 |
| TW | I810032 | 7/2023 |

* cited by examiner

*Primary Examiner* — Keshab R Pandey
(74) *Attorney, Agent, or Firm* — JCIPRNET

(57) ABSTRACT

An electronic apparatus using a USB Type-C port and a compatibility abnormal elimination method thereof are provided. The electronic apparatus includes a USB Type-C port, a processor, and a power delivery controller. In response to receiving a first protocol mode message sent by an external apparatus via the USB Type-C port, the power delivery controller sends a mode request of a first transmission protocol to the processor. The external apparatus supports the first transmission protocol and a second transmission protocol. The power delivery controller omits a first configuration procedure of the first transmission protocol and executes a second configuration procedure of the second transmission protocol according to a notification signal, so as to communicate with the external apparatus according to the second transmission protocol.

14 Claims, 8 Drawing Sheets

ELECTRONIC APPARATUS USING USB TYPE-C PORT AND COMPATIBILITY ABNORMAL ELIMINATION METHOD THEREOF

CROSS-REFERENCE TO RELATED APPLICATION

This application claims the priority benefit of Taiwan application serial no. 113120692, filed on Jun. 4, 2024. The entirety of the above-mentioned patent application is hereby incorporated by reference herein and made a part of this specification.

BACKGROUND OF THE INVENTION

Field of the Invention

The invention relates to a transmission interface technique, and in particular to an electronic apparatus using a USB Type-C port and a compatibility abnormal elimination method thereof.

Description of Related Art

Portable electronic apparatuses have become an integral part of modern life. Portable apparatuses may be connected to various external apparatuses via communication interfaces to expand various functions. Thunderbolt protocol and USB protocol are currently very common and widely used connection techniques. Thunderbolt protocol is known for its high-speed transmission and versatility, and is widely used in fields such as high-performance notebook computers, external storage apparatuses, and monitors. USB protocol is a universal connection standard. Almost all electronic equipment support USB protocol, including computers, mobile phones, tablets, smart home equipment, and the like. Thunderbolt protocol and USB protocol have become mainstream choices for today's portable electronic apparatuses. Although Thunderbolt protocol and USB protocol are two different connection standards, they may share the same interface, namely USB-C interface.

Although both Thunderbolt protocol and USB protocol may share the USB-C interface, not all electronic apparatuses having the USB-C interface support Thunderbolt protocol. Some electronic apparatuses may only support USB protocol and not Thunderbolt protocol, which may readily cause users to encounter incompatibility issues when connecting external apparatuses. In this case, even if both equipment adopt the USB-C interface, they still may not achieve complete compatibility and interoperability. If a portable electronic apparatus is incompatible with an external apparatus, the external apparatus often becomes completely unusable, causing considerable inconvenience.

SUMMARY OF THE INVENTION

The invention provides an electronic apparatus using a USB Type-C port and a compatibility abnormal elimination method thereof that may solve the above technical issues.

An embodiment of the invention provides an electronic apparatus using a USB Type-C port, including a USB Type-C port, a processor, and a power delivery (PD) controller. In response to receiving a first protocol mode message sent by an external apparatus via the USB Type-C port, the power delivery controller sends a mode request of a first transmission protocol to the processor. The external apparatus supports the first transmission protocol and a second transmission protocol. The power delivery controller omits a first configuration procedure of the first transmission protocol and executes a second configuration procedure of the second transmission protocol according to a notification signal, so as to communicate with the external apparatus according to the second transmission protocol.

An embodiment of the invention provides an electronic apparatus using a USB Type-C port, suitable for an electronic apparatus including a USB Type-C port. The method includes the following steps. In response to receiving a first protocol mode message sent by an external apparatus via the USB Type-C port, a mode request of a first transmission protocol is sent to a processor via a power delivery controller. The external apparatus supports the first transmission protocol and a second transmission protocol. A first configuration procedure of the first transmission protocol is omitted and a second configuration procedure of the second transmission protocol is executed according to a notification signal via the power delivery controller, so as to communicate with the external apparatus according to the second transmission protocol.

Based on the above, in an embodiment of the invention, when the power transmission controller of the electronic apparatus receives the first protocol mode message sent by the external apparatus, the power delivery controller sends the mode request of the first transmission protocol to the processor. When the processor does not support the first transmission protocol, the power delivery controller may omit the first configuration procedure of the first transmission protocol and execute the second configuration procedure of the second transmission protocol in response to the notification signal, so as to communicate with the external apparatus according to the second transmission protocol. Accordingly, in the case in which the electronic apparatus supports the second transmission protocol and the external apparatus supports the first transmission protocol and the second transmission protocol, a situation in which the external apparatus connected via the USB Type-C port may not be recognized by the electronic apparatus may be avoided.

In order to make the aforementioned features and advantages of the disclosure more comprehensible, embodiments accompanied with figures are described in detail below.

DESCRIPTION OF THE EMBODIMENTS

Figure 1:
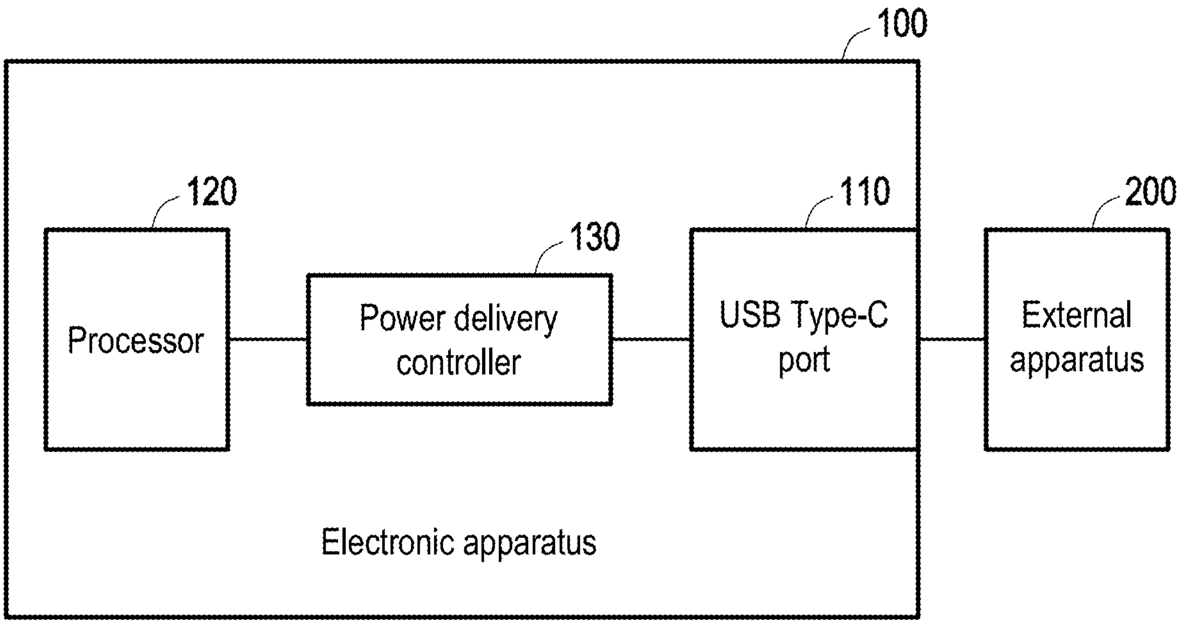
FIG. 1 is a schematic diagram of an electronic apparatus shown according to an embodiment of the invention.

A portion of the embodiments of the disclosure is described in detail hereinafter with reference to figures. In the following, the same reference numerals in different figures should be considered to represent the same or similar elements. The embodiments are only a part of the invention, and do not disclose all possible implementation modes of the invention. Rather, the embodiments are merely examples of devices and methods within the scope of the invention.

Please refer to FIG. 1. FIG. 1 is a schematic diagram of an electronic device shown according to an embodiment of the invention. An electronic apparatus 100 is a portable electronic apparatus, such as a notebook computer or other electronic products. The electronic apparatus 100 includes a USB Type-C port 110, a processor 120, and a power delivery (PD) controller 130.

The electronic apparatus 100 may be connected to an external apparatus 200 via the USB port 110. The external apparatus 200 is also an equipment having a USB Type-C port, such as an external storage apparatus, etc., and the invention is not limited thereto.

The power delivery (PD) controller 130 is a key element in the USB Power Delivery Specification, and is responsible for negotiating charging power, regulating voltage and current, handling communication protocols, and providing security protection, etc. When the external apparatus 200 is connected to the USB Type-C port 110 of the electronic apparatus 100, the PD controller 130 of the electronic apparatus 100 may negotiate the power transmission mode between the external apparatus 200 and the electronic apparatus 100 via the configuration channel (CC) pin of the USB Type-C port 110. The relevant operations of the PD controller 130 are specified in the USB PD standard, and are therefore not described again here.

The processor 120 may be a central processing unit (CPU), a graphics processing unit (GPU), and/or a neural network processor (NPU) of the electronic apparatus 100, but the invention is not limited thereto. The processor 120 may communicate with the PD controller 130 via the bus. In some embodiments, the bus may be an I2C bus.

Figure 2:
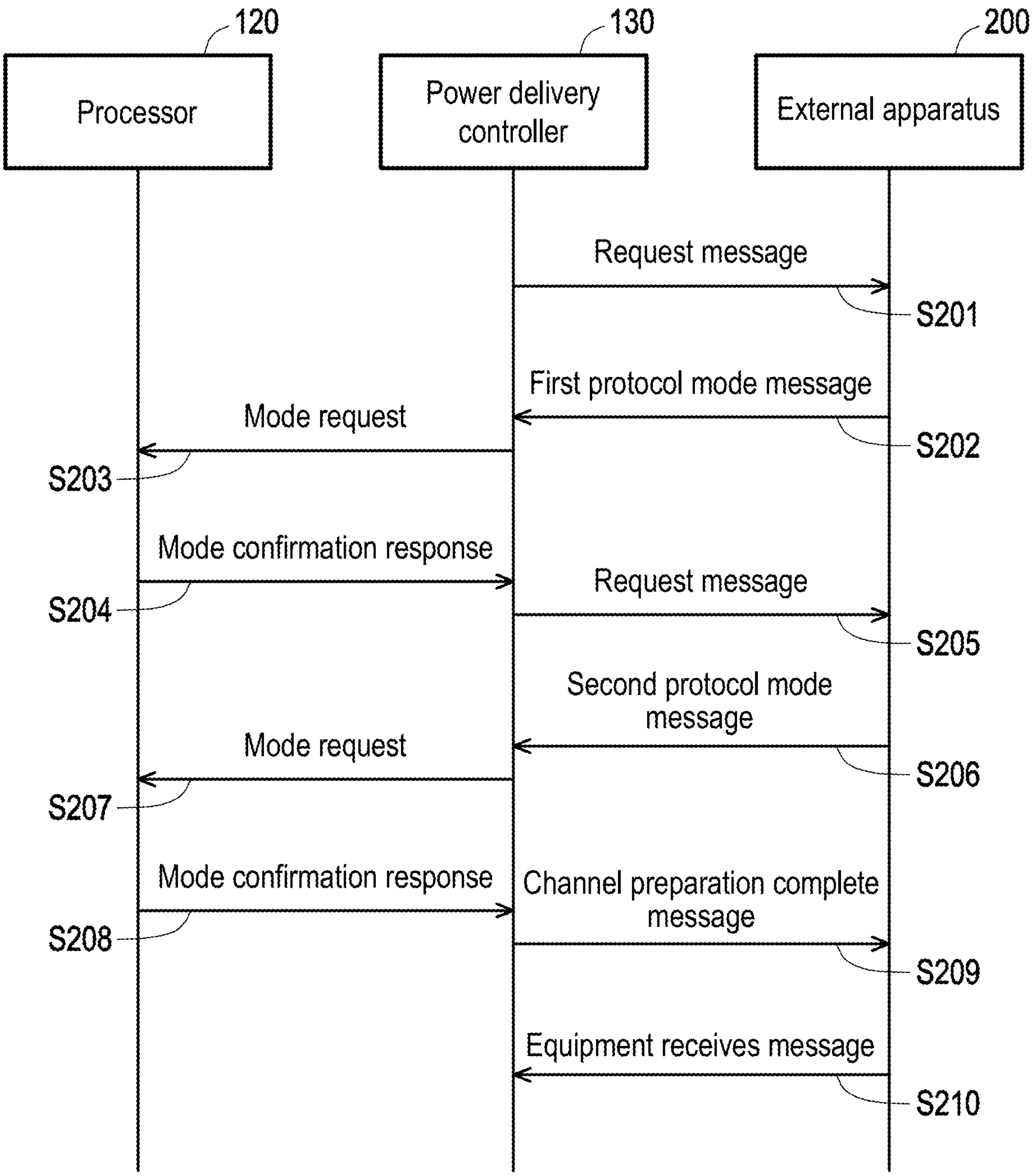
FIG. 2 is a flowchart of a compatibility abnormal elimination method shown according to an embodiment of the invention.

FIG. 2 is a flowchart of a compatibility abnormal elimination method shown according to an embodiment of the invention. Please refer to FIG. 2. After the PD controller 130 detects the insertion of the external apparatus 200, the PD controller 130 may start to execute the handshake procedure specified by the USB PD standard with the external apparatus 200 to ensure that the connection between the electronic apparatus 100 and the external apparatus 200 may be correctly established. After the power roles of the electronic apparatus 100 and the external apparatus 200 are confirmed and the appropriate power configuration is decided, the PD controller 130 performs a protocol mode negotiation procedure with the external apparatus 200 to negotiate a suitable transmission protocol. The reason is that many different transmission protocols may be transmitted using the USB Type-C port 110.

In step S201, the PD controller 130 sends a request message to the external apparatus 200. This request message is used to request the external apparatus 200 to respond to whether the first transmission protocol is supported. When the external apparatus 200 supports the first transmission protocol, in step S202, the external apparatus 200 responds with a first protocol mode message. In step S203, in response to receiving the first protocol mode message sent by the external apparatus 200, the PD controller 130 sends a mode request to the processor 120 to inquire whether the processor 120 supports the first transmission protocol.

In step S204, the processor 120 sends a mode confirmation response to the PD controller 130 in response to the mode request. The response content of the mode confirmation response may be that the first transmission protocol is supported or the first transmission protocol is not supported. When the response content of the mode confirmation response received by the PD controller 130 is that the first transmission protocol is not supported, in step S205, the PD controller 130 sends the request message to the external apparatus 200 again. This request message is used to request the external apparatus 200 to respond to whether the second transmission protocol is supported.

When the external apparatus 200 supports the second transmission protocol, in step S206, the external apparatus 200 responds with a second protocol mode message. In step S207, in response to receiving the second protocol mode message sent by the external apparatus 200, the PD controller 130 sends a mode request to the processor 120 to inquire whether the processor 120 supports the second transmission protocol. When the response content of the mode confirmation response received by the PD controller 130 is that the second transmission protocol is supported, the PD controller 130 executes the configuration procedure of the second transmission protocol, such as channel configuration and so on.

In some embodiments, the first transmission protocol is Thunderbolt protocol, and the second transmission protocol is USB protocol. For example, the first transmission protocol may be Thunderbolt 3 protocol. The second transmission protocol may be USB 4 protocol.

It should be mentioned that, after the processor 120 receives the mode request regarding the first transmission protocol in step S203 (for example, when the processor 120 receives the TBT mode request regarding the Thunderbolt protocol), the processor 120 may not be able to correctly respond with a mode confirmation response that the first transmission protocol is not supported. Therefore, the PD controller 130 is unable to perform a subsequent process, such that the situation in which the external apparatus 200 may not be recognized occurs.

In an embodiment of the invention, even if the processor 120 may not correctly respond with the mode confirmation response that the first transmission protocol is not supported, the PD controller 130 may omit execution of the configuration procedure of the first transmission protocol and execute the configuration procedure of the second transmission protocol according to a notification signal. Accordingly, the PD controller 130 may establish a connection with the external apparatus 200 according to the second transmission protocol to avoid the situation that the external apparatus 200 may not be recognized.

Figure 3:
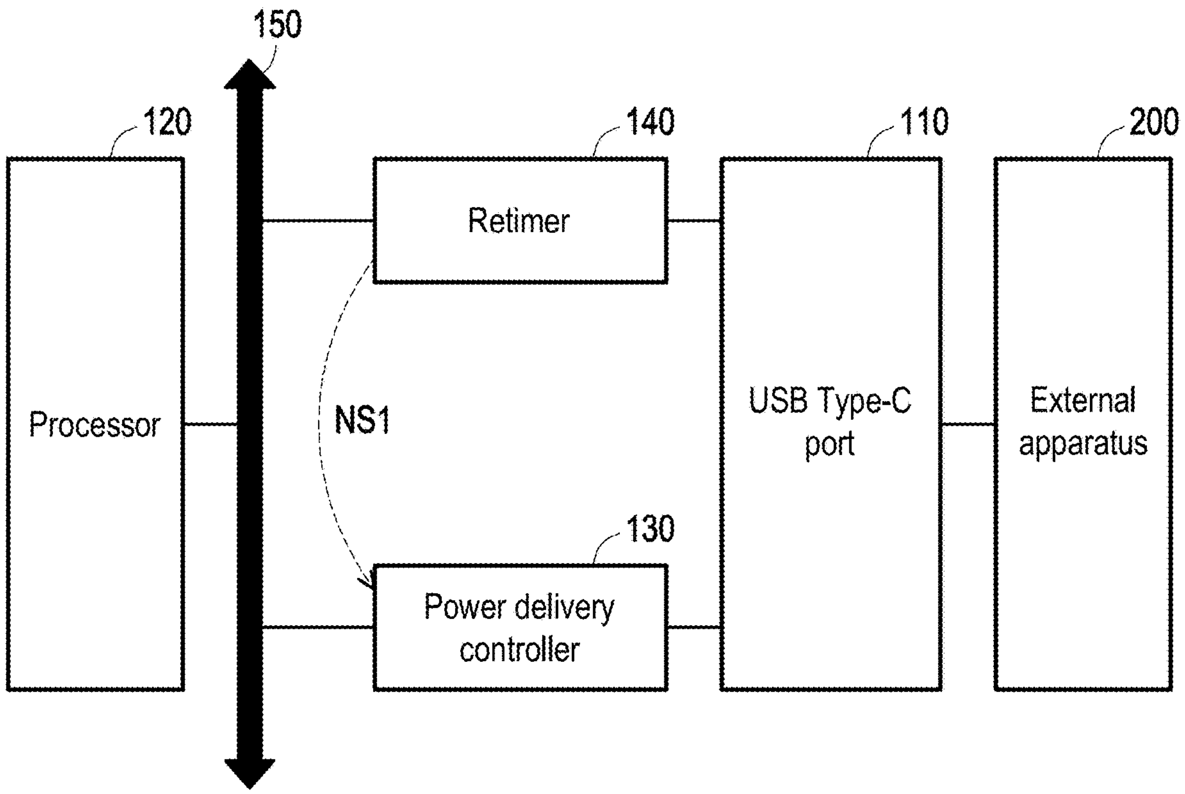
FIG. 3 is a schematic diagram of an electronic apparatus shown according to an embodiment of the invention.

FIG. 3 is a schematic diagram of an electronic apparatus shown according to an embodiment of the invention. Referring to FIG. 3, in some embodiments, the electronic apparatus 100 may further include a retimer 140. The retimer 140 ensures reliable transmission of data. The retimer 140 works at the physical layer (PHY) level, receiving a signal from a transmitter, and retiming, shaping, and amplifying the signal before sending to the receiver to eliminate issues such as delay and distortion introduced during transmission. Additionally, in some embodiments, the processor 120, the PD controller 130, and the retimer 140 may communicate via a bus 150. The bus 150 may be an I2C bus. That is, the retimer 140 may connect the power delivery controller 130 and the processor 120 via the bus 150.

Figure 4:
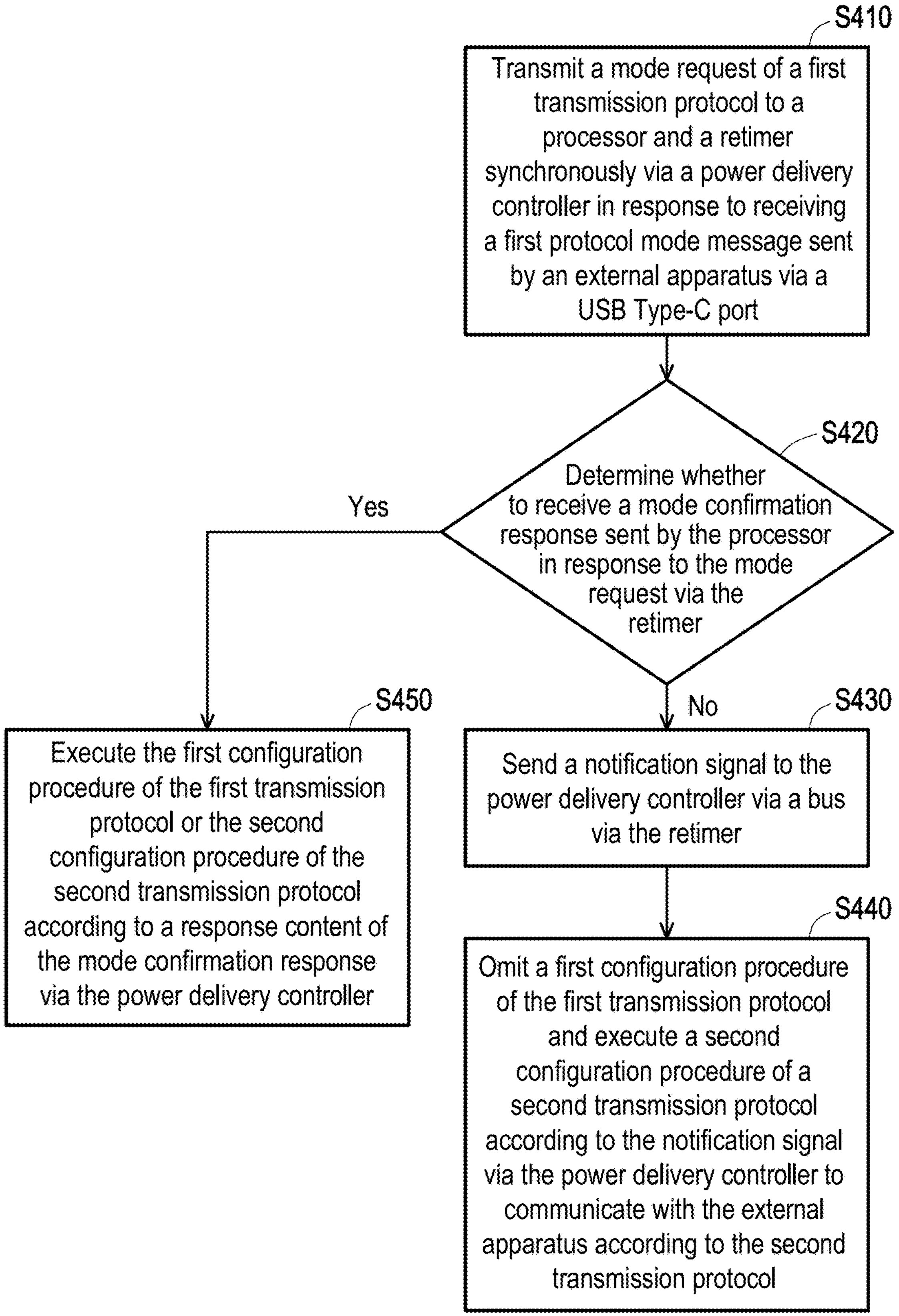
FIG. 4 is a flowchart of a compatibility abnormal elimination method shown according to an embodiment of the invention.

FIG. 4 is a flowchart of a compatibility abnormal elimination method shown according to an embodiment of the invention. The detailed steps of the method are explained below with reference to each element of FIG. 3. Please refer to FIG. 3 and FIG. 4.

In the present embodiment, the retimer 140 may assist the PD controller 130 in deciding whether to directly execute the configuration procedure of the second transmission protocol. In step S410, in response to receiving the first protocol mode message sent by the external apparatus 200 via the USB Type-C port 110, the mode request of the first transmission protocol is synchronously transmitted to the processor 120 and the retimer 140 via the bus 150 via the PD controller 130. For example, the PD controller 130 may synchronously send the mode request of the first transmission protocol to the processor 120 and the retimer 140 by setting the slave end of the I2C transmission.

In step S420, whether the mode confirmation response sent by the processor 120 in response to the mode request is received is determined via the retimer 140. In some embodiments, the retimer 140 determines whether the mode confirmation response sent by the processor 120 in response to the mode request is received within a preset period. The length of the preset period may be configured according to actual needs, and the invention is not limited thereto. In other words, after the mode request of the first transmission protocol sent by the PD controller 130 via the bus 150 is received, the retimer 140 determines whether the mode confirmation response returned by the processor 120 via the bus 150 is received within a preset period of time.

In step S430, in response to not receiving the mode confirmation response sent by the processor 120 in response to the mode request, the notification signal NS1 is sent to the PD controller 130 via the bus 150 via the retimer 140. In step S440, the first configuration procedure of the first transmission protocol is omitted and the second configuration procedure of the second transmission protocol is executed according to the notification signal NS1 via the PD controller 130 to communicate with the external apparatus 200 according to the second transmission protocol. Here, the notification signal NS1 may be a bus packet, such as an I2C packet.

Moreover, in step S450, in response to receiving a mode configuration response sent by processor 120 in response to the mode request, the first configuration procedure of the first transmission protocol or the second configuration procedure of the second transmission protocol is executed according to the response content of the mode confirmation response via the PD controller 130.

More specifically, in some embodiments, after the PD controller 130 receives the Thunderbolt mode message from the external apparatus 200 requesting to use Thunderbolt protocol, the PD controller 130 may synchronously send the mode request to the processor 120 and the retimer 140. When the retimer 140 determines that the processor 120 has not responded to the mode request regarding Thunderbolt protocol, the retimer 140 may send the notification signal NS1 to the PD controller 130. Therefore, the PD controller 130 may continue to execute the configuration procedure of the USB protocol, so that the electronic apparatus 100 may correctly establish a connection with the external apparatus 200 according to the USB protocol.

Figure 5A:
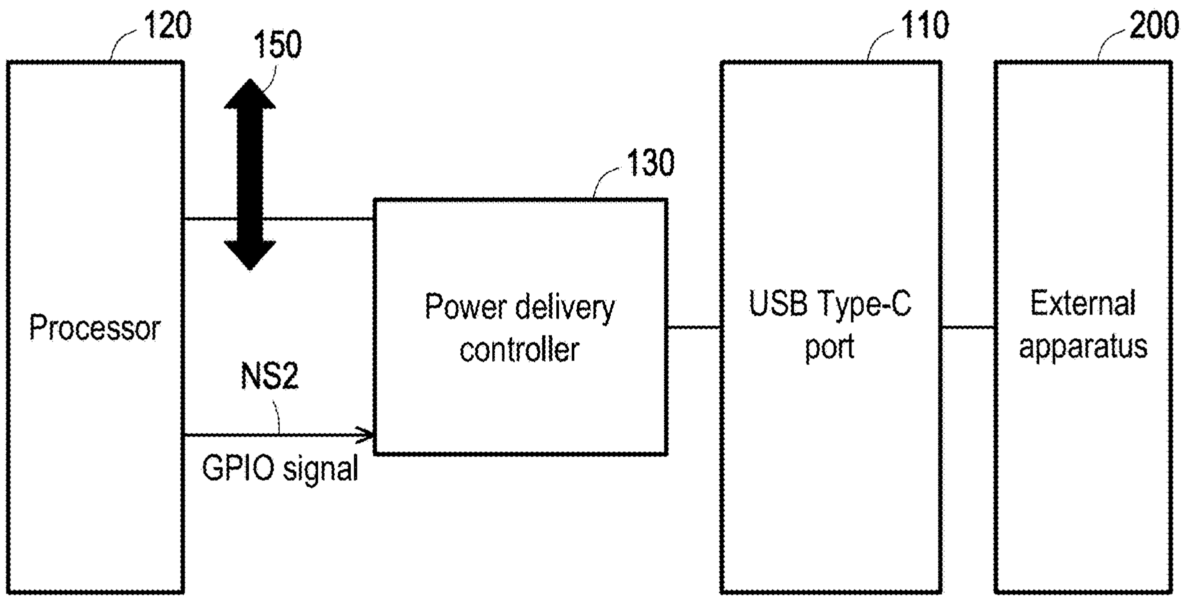
FIG. 5A and FIG. 5B are schematic diagrams of an electronic apparatus shown according to an embodiment of the invention.
Figure 5B:
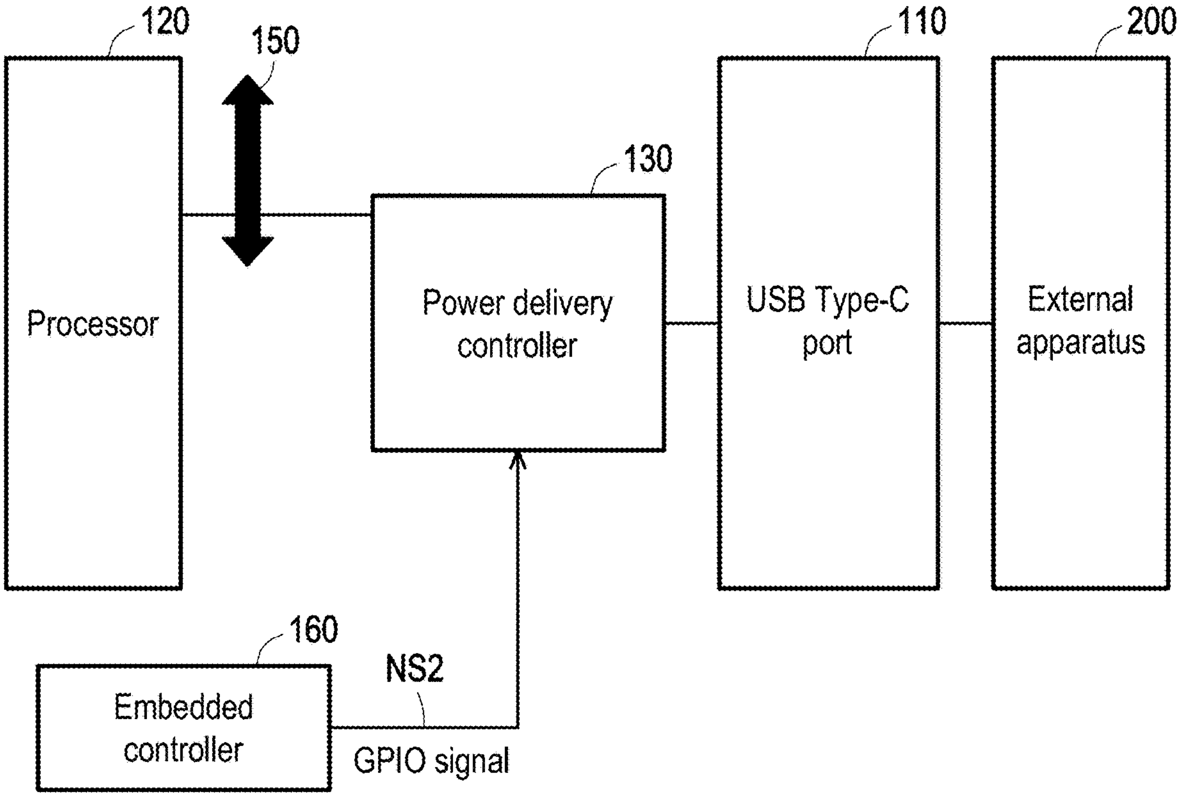

FIG. 5A and FIG. 5B are schematic diagrams of an electronic apparatus shown according to an embodiment of the invention. In some embodiments, the notification signal used to control the PD controller 130 to omit the first configuration procedure of the first transmission protocol may be implemented as a GPIO signal. In response to the level of the GPIO signal being high level or low level, the PD controller 130 may control the execution order of the first configuration procedure of the first transmission protocol and the second configuration procedure of the second transmission protocol.

Referring to FIG. 5A, in some embodiments, the processor 120 may send a GPIO signal NS2 to the PD controller 130, and the GPIO signal NS2 is a notification signal used to control the PD controller 130 to omit the first configuration procedure of the first transmission protocol. Referring to FIG. 5B, in some embodiments, the electronic apparatus 100 may include an embedded controller 160. The embedded controller 160 may send the GPIO signal NS2 to the PD controller 130, and the GPIO signal NS2 is a notification signal used to control the PD controller 130 to omit the first configuration procedure of the first transmission protocol.

Figure 6:
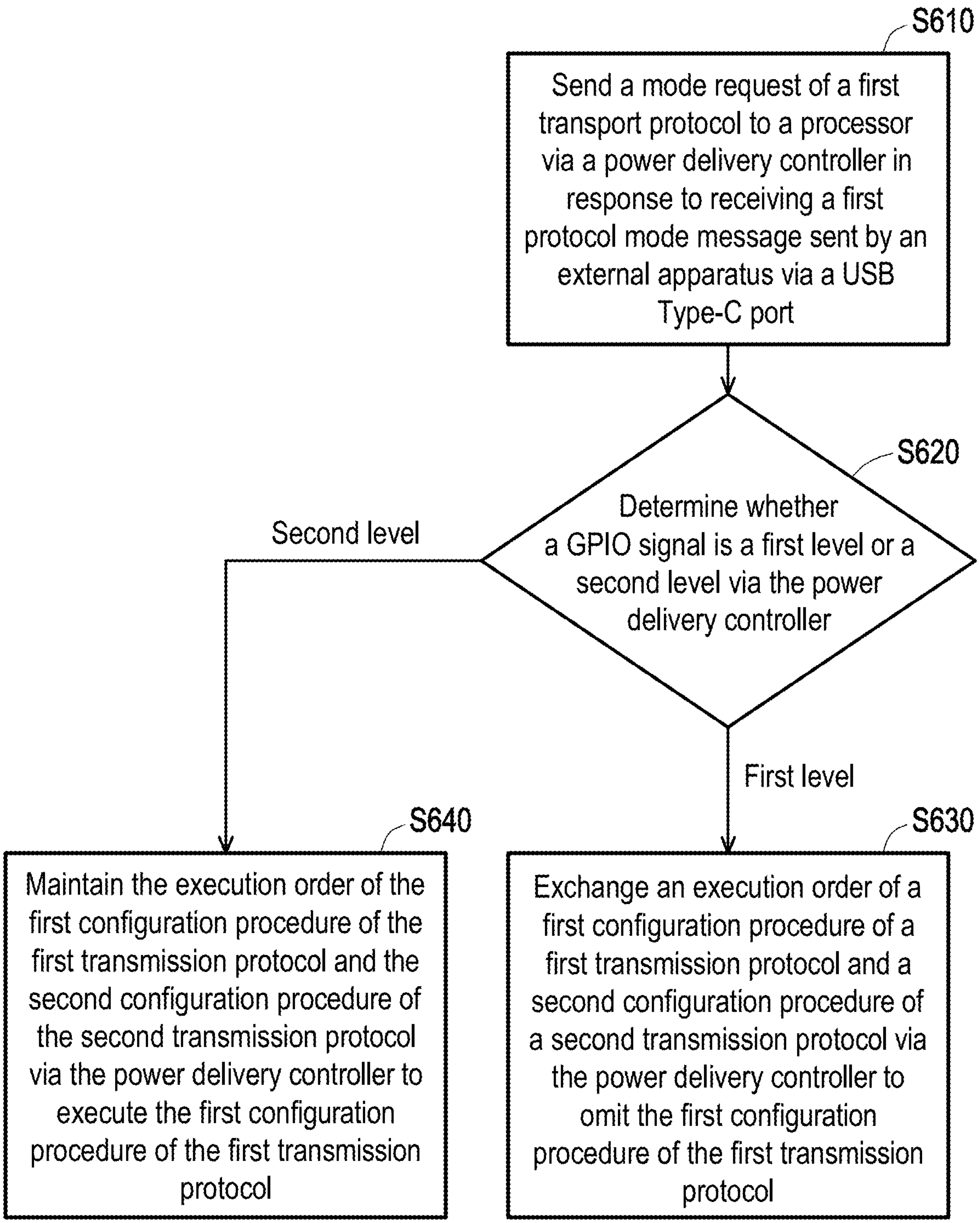
FIG. 6 is a flowchart of a compatibility abnormal elimination method shown according to an embodiment of the invention.

FIG. 6 is a flowchart of a compatibility abnormal elimination method shown according to an embodiment of the invention. The detailed steps of the method are explained below with reference to each element of FIG. 5A and FIG. 5B. Please refer to FIG. 5A, FIG. 5B, and FIG. 6.

In step S610, in response to receiving the first protocol mode message sent by the external apparatus 200 via the USB Type-C port 110, the mode request of the first transmission protocol is sent to the processor 120 via the PD controller 130. Then, in step S620, whether the GPIO signal NS2 is a first level or a second level is determined via the PD controller 130.

In some embodiments, the processor 120 or the embedded controller 160 outputs the GPIO signal NS2. The processor 120 or the embedded controller 160 sets the GPIO signal NS2 to the first level or the second level according to the mode status information of the PD controller 130. The mode status information of the PD controller 130 is used to provide information on the current operating mode of the PD controller 130. In some embodiments, the mode status information may be 1 Byte register information including 8 bits. The 8 bits are used to represent different operating statuses. A specific bit in the mode status information may be used to indicate whether the first transmission protocol is activated.

In some embodiments, the processor 120 or the embedded controller 160 may obtain the mode status information from the PD controller 130 via the bus 150. In some embodiments, the processor 120 or the embedded controller 160 may set the GPIO signal NS2 according to a specific bit of the mode status information. The specific bit may be used to indicate whether the first transmission protocol is activated.

When the specific bit of the mode status information is a first value (for example, '1'), the processor 120 or the embedded controller 160 sets the GPIO signal NS2 to the first level. When the specific bit of the mode status information is a second value (for example, '0'), the processor 120 or the embedded controller 160 sets the GPIO signal NS2 to the second level.

In some embodiments, the first level may be a high level and the second level may be a low level. In some other embodiments, the first level may be a low level and the second level may be a high level.

In step S630, in response to the GPIO signal being the first level, the execution order of the first configuration procedure of the first transmission protocol and the second configuration procedure of the second transmission protocol is exchanged via the PD controller 130 to omit the first configuration procedure of the first transmission protocol. That is, the PD controller 130 may execute the second configuration procedure of the second transmission protocol first to omit the first configuration procedure of the first transmission protocol. For example, the controller 130 may first execute the second configuration procedure of the USB protocol to omit the first configuration procedure of Thunderbolt protocol.

In step S640, in response to the GPIO signal NS2 being the second level, the execution order of the first configuration procedure of the first transmission protocol and the second configuration procedure of the second transmission protocol is maintained via the PD controller 130 to execute the first configuration procedure of the first transmission protocol.

It may be seen that compared with the method shown in FIG. 4, the PD controller 130 may directly execute the second configuration procedure of the second transmission protocol in response to the level of the GPIO signal NS2 without having to wait for a preset period of time before executing the second configuration procedure of the second transmission protocol, thereby improving user experience.

It should also be noted that in some embodiments, the method shown in FIG. 6 may be used in conjunction with the method in FIG. 4. In this way, the PD controller 130 may decide whether to omit the first configuration procedure of the first transmission protocol according to the GPIO signal and the notification signal sent by the retimer 140. For example, in response to the GPIO signal being the second level, the PD controller 130 also needs to decide whether to omit the first configuration procedure of the first transmission protocol according to the notification signal sent by the retimer 140.

Figure 7:
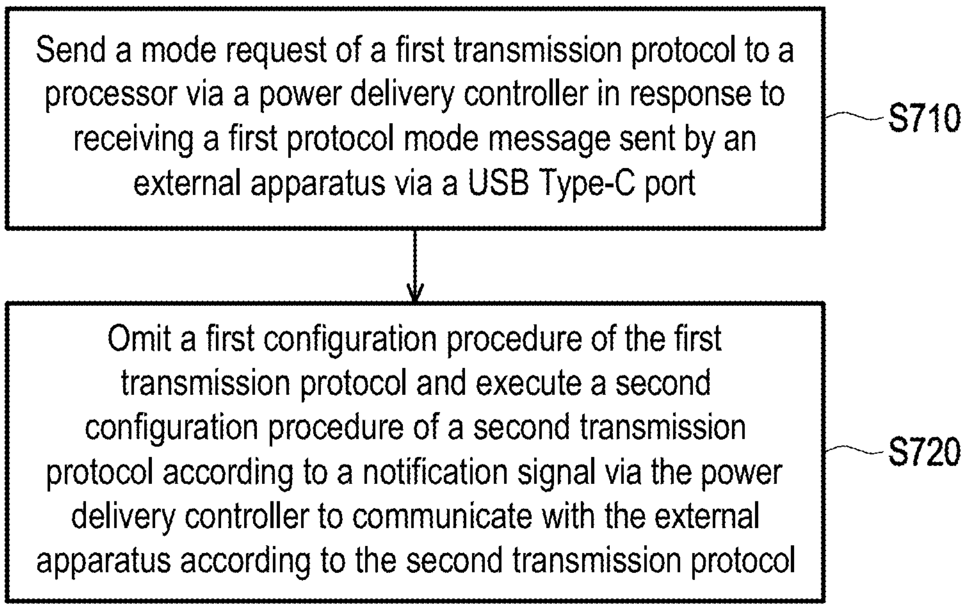
FIG. 7 is a flowchart of a compatibility abnormal elimination method shown according to an embodiment of the invention.

FIG. 7 is a flowchart of a compatibility abnormal elimination method shown according to an embodiment of the invention. The method provided by the present embodiment may be implemented by the electronic apparatus 100 of FIG. 1. The detailed steps of the method are described below with reference to each element of FIG. 1. Please refer to FIG. 1 and FIG. 7. In step S710, in response to receiving the first protocol mode message sent by the external apparatus 200 via the USB Type-C port 100, the mode request of the first transmission protocol is sent to the processor 120 via the PD controller 130. In step S720, the first configuration procedure of the first transmission protocol is omitted and the second configuration procedure of the second transmission protocol is executed according to the notification signal via the PD controller 130 to communicate with the external apparatus 200 according to the second transmission protocol. However, each step in FIG. 7 is as described in detail above, and is not repeated herein.

Based on the above, in an embodiment of the invention, when the processor does not support the first transmission protocol, the power delivery controller may omit the first configuration procedure of the first transmission protocol and execute the second configuration procedure of the second transmission protocol in response to the notification signal, so as to communicate with the external apparatus according to the second transmission protocol. Accordingly, in the case in which the electronic apparatus supports the second transmission protocol and the external apparatus supports the first transmission protocol and the second transmission protocol, a situation in which the external apparatus connected via the USB Type-C port may not be recognized by the electronic apparatus may be avoided.

Although the invention has been described with reference to the above embodiments, it will be apparent to one of ordinary skill in the art that modifications to the described embodiments may be made without departing from the spirit of the disclosure. Accordingly, the scope of the disclosure is defined by the attached claims not by the above detailed descriptions.

What is claimed is:

1. An electronic apparatus, using a USB Type-C port, comprising:
- a USB Type-C port;
- a processor; and
- a power delivery controller sending a mode request of a first transmission protocol to the processor in response to receiving a first protocol mode message sent by an external apparatus via the USB Type-C port, wherein the external apparatus supports the first transmission protocol and a second transmission protocol,
- the power delivery controller omits a first configuration procedure of the first transmission protocol and executes a second configuration procedure of the second transmission protocol according to a notification signal, so as to communicate with the external apparatus according to the second transmission protocol,
- wherein the notification signal is a GPIO signal or a signal sent by a retimer.

2. The electronic apparatus using the USB Type-C port of claim 1, wherein the retimer is connected to the power delivery controller and the processor via a bus,
- wherein the power delivery controller synchronously transmits the mode request of the first transmission protocol to the retimer and the processor via the bus,
- in response to not receiving a mode confirmation response sent by the processor in response to the mode request, the retimer sends the notification signal to the power delivery controller via the bus.

3. The electronic apparatus using the USB Type-C port of claim 1, wherein the retimer determines whether the mode confirmation response sent by the processor in response to the mode request is received within a preset period.

4. The electronic apparatus using the USB Type-C port of claim 1, wherein
- in response to the GPIO signal being a first level, the power delivery controller exchanges an execution order of the first configuration procedure of the first transmission protocol and the second configuration procedure of the second transmission protocol to omit the first configuration procedure of the first transmission protocol.

5. The electronic apparatus using the USB Type-C port of claim 4, wherein the processor or an embedded controller outputs the GPIO signal, and the processor or the embedded controller sets the GPIO signal to the first level or a second level according to mode status information of the power delivery controller.

6. The electronic apparatus using the USB Type-C port of claim 5, wherein when a specific bit of the mode status information is a first value, the processor or the embedded controller sets the GPIO signal to the first level; when the specific bit of the mode status information is a second value, the processor or the embedded controller sets the GPIO signal to the second level.

7. The electronic apparatus using the USB Type-C port of claim 1, wherein the first transmission protocol is a Thunderbolt protocol, and the second transmission protocol is a USB protocol.

8. A compatibility abnormal elimination method, suitable for an electronic apparatus using a USB Type-C port, and comprising:
- sending a mode request of a first transmission protocol to a processor via a power delivery controller in response to receiving a first protocol mode message sent by an external apparatus via the USB Type-C port, wherein the external apparatus supports the first transmission protocol and a second transmission protocol; and omitting a first configuration procedure of the first transmission protocol and executing a second configuration procedure of the second transmission protocol according to a notification signal via the power delivery controller, so as to communicate with the external apparatus according to the second transmission protocol, wherein the notification signal is a GPIO signal or a signal sent by a retimer.

9. The compatibility abnormal elimination method of claim 8, comprising:

transmitting the mode request of the first transmission protocol to the retimer and the processor synchronously via a bus via the power delivery controller;

sending the notification signal to the power delivery controller via the bus via the retimer in response to not receiving a mode confirmation response sent by the processor in response to the mode request.

10. The compatibility abnormal elimination method of claim 9, wherein the step of sending the notification signal to the power delivery controller via the bus via the retimer in response to not receiving a mode confirmation response sent by the processor in response to the mode request comprises:

determining whether the mode confirmation response sent by the processor in response to the mode request is received within a preset period via the retimer.

11. The computability abnormal elimination method of claim 8, wherein the step of omitting the first configuration procedure of the first transmission protocol and executing the second configuration procedure of the second transmission protocol according to the notification signal via the power delivery controller, so as to communicate with the external apparatus according to the second transmission protocol comprises:

exchanging an execution order of the first configuration procedure of the first transmission protocol and the second configuration procedure of the second transmission protocol via the power delivery controller in response to the GPIO signal being a first level to omit the first configuration procedure of the first transmission protocol.

12. The compatibility abnormal elimination method of claim 11, comprising:

outputting the GPIO signal via the processor or an embedded controller, wherein the processor or the embedded controller sets the GPIO signal to the first level or a second level according to mode status information of the power delivery controller.

13. The computability abnormal elimination method of claim 12, wherein when a specific bit of the mode status information is a first value, the processor or the embedded controller sets the GPIO signal to the first level; when the specific bit of the mode status information is a second value, the processor or the embedded controller sets the GPIO signal to the second level.

14. The computability abnormal elimination method of claim 8, wherein the first transmission protocol is a Thunderbolt protocol, and the second transmission protocol is a USB protocol.

* * * * *